(No Model.)
J. W. NEILL.
METHOD OF AND APPARATUS FOR SEPARATING AND SETTLING MOLTEN METAL.
No. 505,904. Patented Oct. 3, 1893.
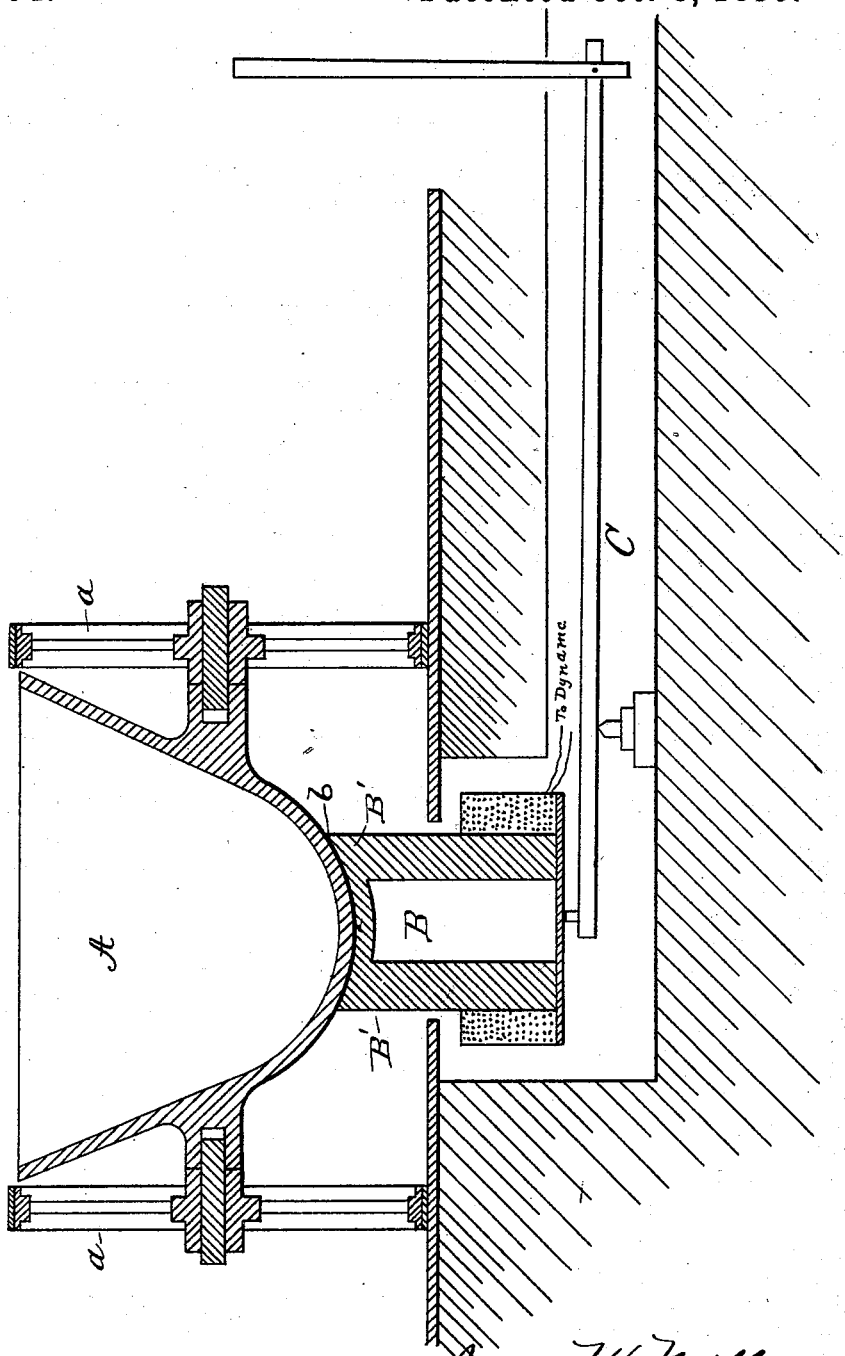

UNITED STATES PATENT OFFICE.

JAMES W. NEILL, OF SALT LAKE CITY, UTAH TERRITORY.

METHOD OF AND APPARATUS FOR SEPARATING AND SETTLING MOLTEN METAL.

SPECIFICATION forming part of Letters Patent No. 505,904, dated October 3, 1893.

Application filed February 9, 1893. Serial No. 461,554. (No model.)

*To all whom it may concern:*

Be it known that I, JAMES W. NEILL, a citizen of the United States, residing at Salt Lake City, in the county of Salt Lake and Territory of Utah, have invented certain new and useful Improvements in Methods of and Apparatus for Separating and Settling Molten Metal; and I do hereby declare the following to be a full, clear, and exact description of the invention, such as will enable others skilled in the art to which it appertains to make and use the same.

My invention has for its object a method of and apparatus for magnetically settling or separating molten products in fore-hearths or settling pots.

In the operation of settling or smelting many ores of silver, gold, lead, copper and other metals, products are usually formed called "matte" and "speiss." These products are the compounds of iron with sulphur (the matte) or of iron with arsenic (the speiss). Both of these products usually contain precious metals and they therefore, are saved and subjected to further treatment. These products flow from the furnace in a molten condition, usually together with the molten slag which of itself is of no value. The products, matte and speiss, are of a greater specific gravity than that of the slag and they are usually collected and saved by permitting the molten materials to flow or pass into suitable vessels or receptacles wherein said products settle normally by gravity in the lighter material or the slag, to the bottom of the receptacles. This operation is often made nearly continuous by permitting the flow of molten materials from the furnace to pass into a large receptacle (a settler or fore-hearth) in which the matte or speiss are retained, while the slag or lighter material overflows. This operation is always imperfect for various reasons well known to those skilled in the art to which my invention appertains.

I have discovered that the products matte or speiss while still in a molten condition, are magnetic or attractable by magnets and being so, are adapted to be more efficiently and quickly separated from and settled out of the molten lighter materials or slag, when their normal gravity settling action is assisted by magnetic lines of attractive force corresponding with those of their normal gravity action and the method of and apparatus for producing such combined gravity and magnetic separation of molten products in a settler or fore-hearth constitutes my invention, referring to the accompanying drawing which represents a sectional elevation of a settling pot and electro-magnetic devices embodying my improvements.

A represents any suitable form and kind of settling pot or fore-hearth. As shown in the drawing it is mounted upon wheels *a a* so as to be movable from place to place.

B represents any suitable form of electro-magnetic devices in circuit with a suitable source of electric supply. The magnet or magnets B' are so located as to be adjacent or contiguous to the bottom of the settler A in order that the attractive lines of the field of force of the magnets will correspond with those of the normal gravity action of the magnetic materials in the pot or hearth. To facilitate so locating said magnet B it is preferably supported upon a lever C in any suitable manner so that by suitably moving said lever the magnet is advanced to and withdrawn from the bottom of the settler A.

To admit of the magnet contacting with the desired part of the settler, the end of surface *b* of the core *b'* of magnet B is shaped to conform to the configuration of the settler A as shown, but this is not essential and may be varied as desired.

When the magnet B is arranged to be movable to and from the settler A the latter is readily removable when full for replacement by an empty settler.

A vessel or settler A being placed over or contiguous to the magnet or magnets B and in front of a furnace which is not shown in the drawing, the magnet is moved to position relatively to the settler and its circuit to its source of electric supply is closed. The molten materials are then tapped out of the furnace and run into the settler A filling it. The magnetic products (matte or speiss) are attracted by the magnets materially assisting in the separation and settling of them, from the slag or the lighter material which is non-magnetic and flows out of the settlers through a suitable opening, in a cleaner condition than is possible when the settling and separation are effected in the usual way, or without the aid of magnets. When the settler or fire-hearth has accumulated a quantity of matte or speiss or magnetic materials, they may be removed from the settler through a suitable opening near or at the bottom of the same, or the settler may be removed and a new settler substituted; the magnet or magnets B being withdrawn from the filled settler to admit of its removal.

The practice of my invention results in saving of time and facility of working in separating and settling the matte or speiss or magnetic molten products from the non-magnetic molten materials and also in increasing the amount of such settling and separation with corresponding cleaner slags and greater output of valuable products.

I am aware that electro-magnet devices have been employed in connection with the manufacture of iron, but the same differ from my invention in that the molten metal is either brought into direct contact with the magnets at their poles for setting up a violent ebullition or the molten metal is subject to magnetic currents from oppositely located magnetic poles whereas in my improved method the magnetic products are only brought within the attractive action of the field of force of a pole of magnet in line with their normal gravity action and being subject to such attraction the settling of the same is more rapidly and economically effected.

What I claim is—

1. The process of separating heavier molten magnetic products from lighter non-magnetic molten materials by gravity and magnetic attraction, which consists in bringing such molten materials within the action of a magnetic field of force and subjecting them to the attractive action of such field of force coincidently and simultaneously with the normal gravity settling action of such heavier molten materials, substantially as set forth.

2. The process or method of separating and settling matte or speiss from molten materials or slag by the combined forces of gravity and magnetic attraction, which consists in flowing the molten materials into a suitable vessel, then subjecting the same to attractive action of a magnetic field of force located in line with the normal gravity settling action of such heavier molten materials substantially as set forth.

3. The combination of a settler or forehearth, and an electro-magnet or magnets located below said forehearth and having its field of force contiguous the bottom of said hearth, substantially as set forth.

4. The combination of a settler or forehearth, and an electro-magnet or magnets located below said forehearth and having its field of force contiguous the bottom of said hearth and device for moving said magnets to and from the settler, substantially as set forth.

5. The combination of a movable settler or forehearth, electro-magnet or magnets located below the bottom of said settler and movable to and from the settler, substantially as set forth.

In testimony whereof I affix my signature in presence of two witnesses.

JAMES W. NEILL.

Witnesses:
F. L. HOLLAND,
H. M. BACON.